US 6,698,765 B2

(12) United States Patent
Isogai

(10) Patent No.: US 6,698,765 B2
(45) Date of Patent: Mar. 2, 2004

(54) METAL LAMINATE GASKET WITH CONTINUOUS BEAD

(75) Inventor: Soichi Isogai, Tokyo (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 0 days.

(21) Appl. No.: 10/013,516

(22) Filed: Dec. 13, 2001

(65) Prior Publication Data

US 2002/0074737 A1 Jun. 20, 2002

(30) Foreign Application Priority Data

Dec. 20, 2000 (JP) ........................................ 2000-386995

(51) Int. Cl.[7] ............................................... F02F 11/00
(52) U.S. Cl. ........................ 277/595; 277/590; 277/594
(58) Field of Search .............................. 277/590, 594, 277/595, 591

(56) References Cited

U.S. PATENT DOCUMENTS

| 1,472,133 | A | * | 10/1923 | Oven ........................... 277/598 |
| 2,681,241 | A | * | 6/1954 | Aukers ......................... 277/596 |
| 4,998,741 | A | * | 3/1991 | Udagawa ....................... 277/595 |
| 5,226,663 | A | * | 7/1993 | Miyaoh ........................ 277/595 |
| 5,277,434 | A | * | 1/1994 | Kestly et al. ................. 277/592 |
| 5,306,023 | A | * | 4/1994 | Udagawa ....................... 277/601 |
| 5,348,315 | A | * | 9/1994 | Kawaguchi et al. ........... 277/595 |
| 5,385,354 | A | * | 1/1995 | Hagiwara et al. ............ 277/594 |
| 5,449,181 | A | * | 9/1995 | Miyaoh ....................... 277/595 |
| 5,490,681 | A | * | 2/1996 | Plunkett et al. .............. 277/592 |
| 5,544,899 | A | * | 8/1996 | Ueta ........................... 277/595 |
| 5,609,345 | A | * | 3/1997 | Miura et al. ................. 277/593 |
| 5,970,612 | A | * | 10/1999 | West ........................... 29/888.3 |
| 6,406,032 | B1 | * | 6/2002 | Miyaoh ....................... 277/594 |

FOREIGN PATENT DOCUMENTS

| JP | 06117542 A | * | 4/1994 | ............ F16J/15/08 |
| JP | 7-243531 | | 9/1995 | |
| JP | 63186950 A | * | 8/1998 | ............ F02F/11/00 |

* cited by examiner

Primary Examiner—Anthony Knight
Assistant Examiner—Michael J. Kyle
(74) Attorney, Agent, or Firm—Kanesaka & Takeuchi

(57) ABSTRACT

A metal gasket is formed by a bead plate provided with a continuous bead, and an outer plate partly bent around combustion chamber holes to laminate the metal plates together. The bead has a linear common portion situated in an intermediate area between two cylinder bore holes, curved surrounding portions diverging from the linear common portion near the one second hole to partly surround the cylincder bore and water hole, and a curved linking portion extending between the curved surrounding portions to partly surround the water hole. The water hole is completely surrounded by the parts of the curved surrounding portions and the curved linking portion.

8 Claims, 3 Drawing Sheets

METAL LAMINATE GASKET WITH CONTINUOUS BEAD

BACKGROUND OF THE INVENTION AND RELATED ART STATEMENT

The present invention relates to a metal gasket with a continuous bead interposed between a cylinder head and cylinder block of an internal combustion engine.

Conventionally, in a cylinder head gasket interposed between a cylinder head and a cylinder block of an internal combustion engine, especially in case the gasket seals a water hole located close to an area between two combustion holes of the engine where an interval between the combustion holes is narrow, there is a difficulty in sealing the water hole.

Also, in recent years, in order to secure a durability of the gasket itself, a metal gasket has been used widely. In the metal gasket, in case an interval or intermediate area between the combustion chamber holes adjacent to each other is narrow, beads around these combustion chamber holes are connected to each other to form a common portion in the intermediate area between the combustion chamber holes. In this case, curved portions surrounding the combustion chamber holes diverge at an intersecting portion from the common portion. However, if it is tried to form a water hole outside the intersecting portion close to the center of the intermediate area between the combustion chamber holes, it is difficult to surround a periphery of the water hole by the curved portions of the bead.

Accordingly, an object of the invention is to provide a metal laminate gasket with a continuous bead, in which a water hole can be formed outside the bead intersecting portion and close to a center of the intermediate portion between the combustion chamber holes.

Another object of the invention is to provide a metal laminate gasket as stated above, in which intermediate portion between the adjacent combustion chamber holes and the water hole can be effectively sealed by bead portions.

Further objects and advantages of the invention will be apparent from the following description of the invention.

SUMMARY OF THE INVENTION

A metal laminate gasket of the invention is used for an internal combustion engine having a plurality of cylinder bores and at least one water hole. The gasket is basically formed by a first metal plate, and a second metal plate laminated together.

The first metal plate includes a plurality of first holes corresponding to the cylinder bores, an intermediate area between two first holes, at least one second hole corresponding to the at least one water hole and located in the intermediate area, and a continuous bead situated around the first and second holes. The bead has a linear common portion situated in the intermediate area, curved surrounding portions diverging from the linear common portion at an intersecting section near the at least one second hole to partly surround the first and at least one second holes, and a curved linking portion extending between the curved surrounding portions to partly surround the at least one second hole. The second hole is completely surrounded circularly by the curved surrounding portions and the curved linking portion.

The second metal plate has a main portion laminated on the first metal plate, third and fourth holes corresponding to the first and second holes, curved portions situated in the respective first holes, and flanges extending from the respective curved portions and located partly over the first metal plate to sandwich the first metal plate between the main portion and the flange. Each flange has a linear edge at the intermediate area to sandwich the linear common portion between two of the linear edges, and a curved edge surrounding the first hole.

In the metal gasket of the invention, since the periphery of the second hole, i.e. water hole, formed outside the bead intersecting portion between the adjacent first holes, i.e. combustion chamber holes, is surrounded and sealed by the curved surrounding portions and the curved linking portions, the water hole can be provided close to the center at the immediate portion outside of the bead intersecting portion.

The metal laminate gasket may further include a third metal plate laminated on the first metal plate to sandwich the first metal plate between the main portion and the flange of the second metal plate. The third metal plate includes a thick portion laminated on the bead and thin portions laminated on the flanges. Instead of forming the thick and thin portions, a fourth metal plate may be laminated on the third metal plate to be located at the continuous bead. Accordingly, the bead can provide a strong surface pressure when the gasket is compressed between the cylinder head and the cylinder block.

DETAILED DESCRIPTION OF PREFERRED EMBODIMENTS

Figure 1:
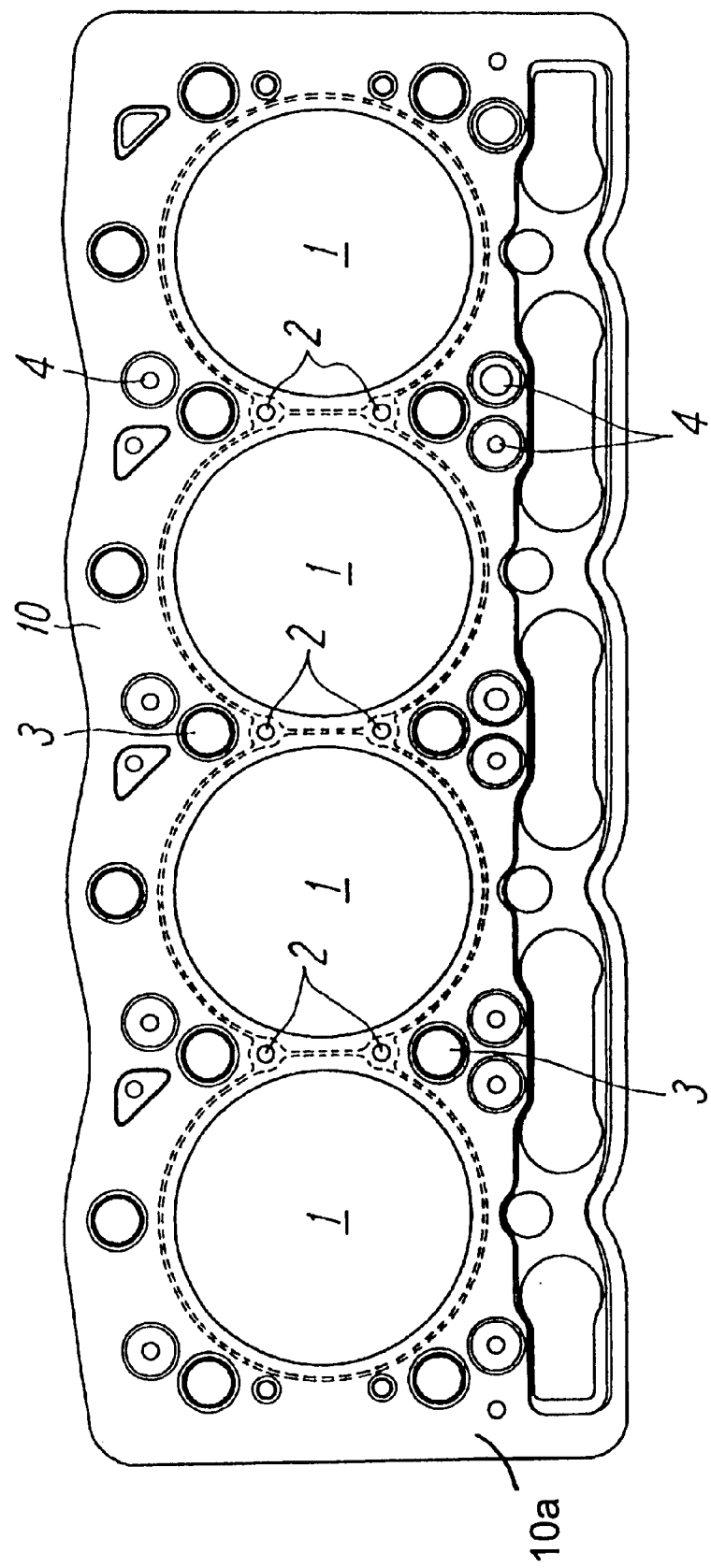
FIG. 1 is a plan view showing an embodiment of a metal laminate gasket according to the present invention.
Figure 2:
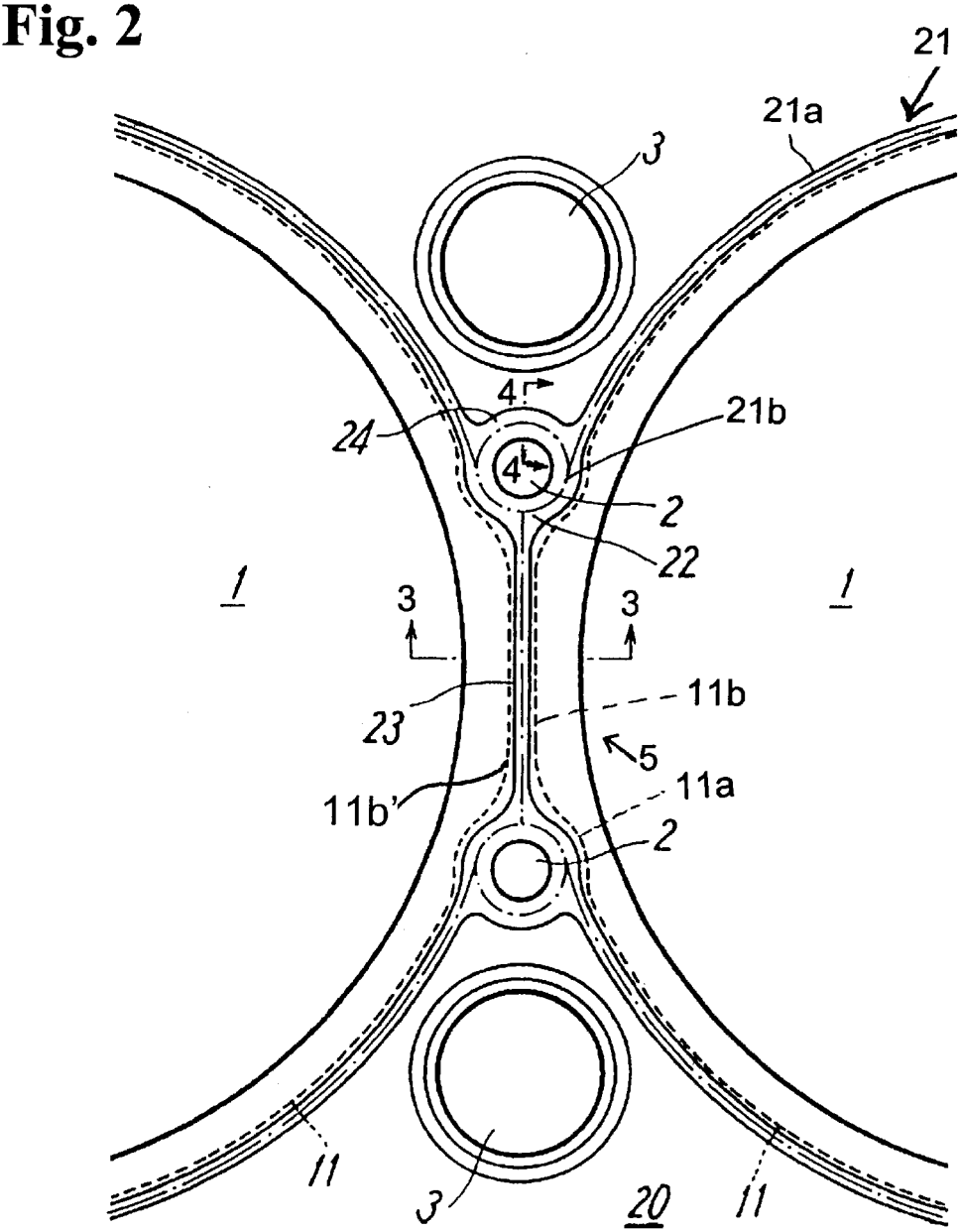
FIG. 2 is an enlarged plan view showing a main section of the embodiment, in which an outer plate is omitted.
Figure 3:
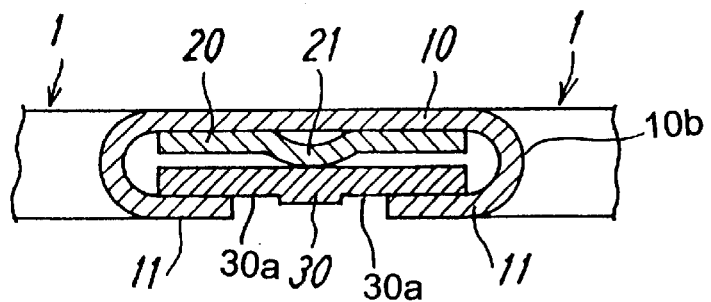
FIG. 3 is a cross sectional view taken along line 3—3 in FIG. 2.
Figure 4:
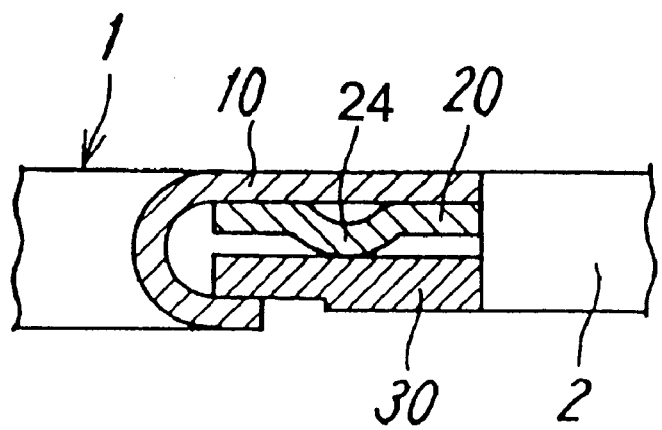
FIG. 4 is a cross sectional view taken along line 4—4 in FIG. 2.

FIGS. 1 through 4 show an embodiment of a metal gasket according to a present invention. A metal gasket is formed by laminating a plurality of (three or more) metal plates, and here, the metal gasket is formed by an outer plate 10, a bead plate 20 and a sealing plate 30 laminated together. The outer plate 10 includes a main portion 10a extending substantially throughout the entire area of the gasket, curved portions 10b extending from the main portion 10a to surround respective combustion chamber holes 1, and flanges 11 extending from the curved portions 10b to hold and fix the bead plate 20 and the sealing plate 30 between the main portion 10a and the flange 11.

The bead plate 20 includes a continuous bead 21 surrounding the combustion chamber holes 1 and water holes 4. The sealing plate 30 abuts against the continuous bead 21 formed in the bead plate 20. The metal gasket includes the aforementioned plates 10, 20 and 30, and in addition, still another metal plate or the like may be laminated.

As shown in FIG. 1, in the gasket formed by laminating the metal plates, a plurality of combustion chamber holes 1 is closely disposed with a narrow interval or intermediate area 5 therebetween, and water holes 2 are formed outside bead intersecting portions 22 of the bead 21, described later, in a space between the adjacent combustion chamber holes 1. Also, bolt holes 3, other fluid holes 4 and the like, which are necessary to the gasket, are formed.

In the outer plate 10 forming the gasket, the portions, i.e. curved portions 10b, around the respective combustion chamber holes 1 are bent, and the flanges 11 extend from the curved portions 10b to fix other laminated metal plates between the main portion 10a and the flange 11. The curved portions 10b and flanges 11 form sealing sections around the combustion chamber holes 1. In order to fix the other metal plates, not only the portions around the combustion chamber holes 1 but also outer peripheries of other portions of the outer plate 10 may be bent.

The bead plate 20 held by the flanges 11 of the outer plate 10 is formed of a spring steel plate, and includes the continuous bead 21. The continuous bead 21 includes curved bead portions or curved surrounding portions 21a surrounding the respective combustion chamber holes 1 for sealing the periphery thereof, a common linear portion or common bead 23, and a curved linking portion or connection bead 24. Namely, in the intermediate area 5 between the two adjacent combustion chamber holes 1, the curved bead portions 21a around the respective combustion chamber holes 1 are combined to thereby form the common bead 23. In other words, the common bead 23 is located between the bead intersecting portions 22. The bead width of the common bead 23 is the same as that of the curved portions 21a around the combustion chamber hole 1, or may be wider.

In the gasket, the water holes 2 are formed immediately outside the bead intersecting portions 22, and the connection bead 24 is formed between the curved bead portions 21a. A circular sealing section surrounding a periphery of the water hole 2 is formed by parts 21b of the curved bead portions 21a and the connection bead 24. Thus, the parts 21b of the curved bead portions 21a slightly project toward the combustion chamber holes 1. Incidentally, the centers of the respective beads described above are shown by one-dotted chain lines in FIG. 2.

On the other hand, the sealing plate 30 is located outside the bead plate 20 and abuts against the curved bead 21a, the common bead 23 and the connection bead 24 to seal the abutting portions. The sealing plate 30 has dented portions 30a around the combustion chamber holes 1 where the flanges 11 are placed. The depth of the dented portion 30a is less than the thickness of the flange 11. Therefore, when the gasket is tightened, the surface pressure without elasticity is formed at the flanges 11, and the surface pressure with elasticity is formed on the continuous bead 21.

Figure 5:
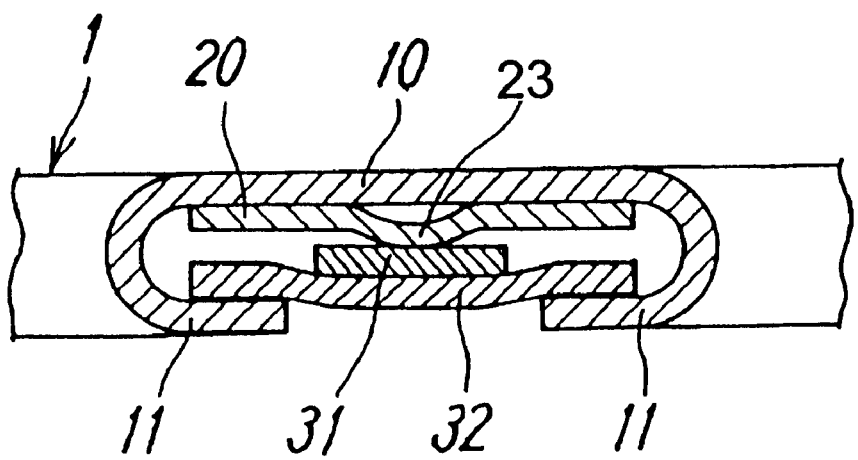
FIG. 5 is a cross sectional view, similar to FIG. 3, of another embodiment of the metal gasket of the invention.

As shown in FIG. 5, instead of the sealing plate 30, it is possible to use a sealing plate 31 which abuts against the continuous bead 21 of the bead plate 20, and an outer plate 32 which is laminated with the sealing plate 31 to thereby cover and enclose the sealing plate 31. The surface pressure by the bead 21 is supported by the sealing plate 31.

In the invention, since the water holes 2 are formed close to the center of the intermediate area 5 between the combustion chamber holes 1, parts, i.e. curved dents, 11a of the flange 11 are dented close to the combustion chamber holes 1, and middle areas 11b of the flanges 11 located between the water holes 2 are formed linearly to have a linear edge 11b'. The middle areas 11b sandwich the common bead 23 to securely seal between the combustion chamber holes 1.

Incidentally, it is not always necessary to laminate a plurality of the metal plates forming the gasket in the order described above, and it is sufficient that the continuous bead 21 including the curved bead 21a, the common bead 23 and connection bead 24, is formed in one of the metal plates described above, and the sealing plate 30 abuts against these beads.

In the metal gasket structured as described above, since the periphery of the water hole 2 formed outside the bead intersecting portion 22 between the adjacent combustion chamber holes 1 is surrounded and sealed by the curved beads 21a, which surround the combustion chamber holes 1, and the connection bead 24, it is possible to provide the water hole 2 at the immediate area outside the bead intersecting portion 22 between the two adjacent combustion chamber holes 1.

Also, the metal gasket of the invention includes the outer plate 10 which are bent around the combustion chamber holes 1 to fix a plurality of the metal plates, the bead plate 20 in which the bead portions 21a, 23, 24 are formed, and the sealing plate abutting against the beads 21a, 23 and 24. Accordingly, the narrow intermediate area 5 between the adjacent combustion chamber holes and the periphery of the water hole 2 can be effectively sealed by the continuous bead 21.

As described above, according to the metal gasket of the invention, the water hole can be formed close to the combustion chamber hole outside the bead intersecting section. Also, in the gasket in which a plurality of metal plates is laminated, the narrow portion between the adjacent combustion chamber holes and the periphery of the water hole can be effectively sealed by the bead.

While the invention has been explained with reference to the specific embodiments of the invention, the explanation is illustrative and the invention is limited only by the appended claims.

What is claimed is:

1. A metal laminate gasket for an internal combustion engine having a plurality of cylinder bores and at least one water hole, comprising:

a first metal plate including a plurality of first holes corresponding to the cylinder bores, at least one intermediate area between two of the first holes, at least one second hole corresponding to the at least one water hole and located in the intermediate area, and a continuous bead situated around the first and second holes, said bead having a linear common portion situated in the intermediate area, curved surrounding portions diverging from the linear common portion near the at least one second hole to partly surround the first holes and at least one second hole, a bead intersecting portion intersecting at the linear common portion and curved surrounding portions, and a curved linking portion extending between the curved surrounding portions to partly surround the at least one second hole so that the curved linking portion, the bead intersecting portion and parts of the curved surrounding portions adjacent to the bead intersecting portion form a sealing section directing facing and surrounding the second hole, and a second metal plate having a main portion laminated on the first metal plate, third and fourth holes corresponding to the first and second holes, curved portions situated in the respective first holes, and flanges extending from the respective curved portions and located partly over the first metal plate to sandwich the first metal plate between the main portion and the flange, each flange having a linear edge at the intermediate area to sandwich the linear common portion between two of the linear edges.

2. A metal laminate gasket according to claim 1, wherein each flange further includes a curved dent located immediately outside the at least one second hole.

3. A metal laminate gasket according to claim 2, wherein said sealing section formed by the curved linking portion, the bead intersecting portion and the parts of the curved surrounding portions is a circular bead around the second hole.

4. A metal laminate gasket according to claim 3, further comprising a third metal plate laminated on the first metal plate to sandwich the first metal plate between the main portion and the third metal plate.

5. A metal laminate gasket according to claim 4, wherein said third metal plate includes a thick portion laminated with the bead and thin portions laminated with the flanges.

6. A metal laminate gasket according to claim 4, further comprising a fourth metal plate laminated on the third metal plate and located over the entire bead.

7. A metal laminate gasket according to claim 4, wherein said first and second metal plates further include two bolt holes to sandwich the intermediate area and the second and fourth holes therebetween.

8. A metal laminate gasket according to claim 7, wherein said bolt holes and second and fourth holes are arranged symmetrically to each other relative to a line linking centers of two first holes situated adjacent to each other.

* * * * *